US012286069B2

(12) United States Patent
Partow-Navid

(10) Patent No.: US 12,286,069 B2
(45) Date of Patent: Apr. 29, 2025

(54) CONTENT FILTERING AT A USER EQUIPMENT (UE)

(71) Applicant: Rod Partow-Navid, Diamond Bar, CA (US)

(72) Inventor: Rod Partow-Navid, Diamond Bar, CA (US)

(*) Notice: Subject to any disclaimer, the term of this patent is extended or adjusted under 35 U.S.C. 154(b) by 0 days.

(21) Appl. No.: 18/337,016

(22) Filed: Jun. 18, 2023

(65) Prior Publication Data
US 2023/0331180 A1 Oct. 19, 2023

Related U.S. Application Data

(63) Continuation of application No. 17/518,585, filed on Nov. 3, 2021, now Pat. No. 11,718,254.

(60) Provisional application No. 63/109,155, filed on Nov. 3, 2020.

(51) Int. Cl.
B60R 21/0134 (2006.01)
B60Q 9/00 (2006.01)
B60R 21/01 (2006.01)

(52) U.S. Cl.
CPC .......... B60R 21/0134 (2013.01); B60Q 9/008 (2013.01); B60R 2021/01013 (2013.01); B60R 2021/01252 (2013.01)

(58) Field of Classification Search
None
See application file for complete search history.

(56) References Cited

U.S. PATENT DOCUMENTS

| | | | | |
|---|---|---|---|---|
| 8,495,660 | B1* | 7/2013 | Hernacki | H04L 51/08 719/314 |
| 9,423,871 | B2* | 8/2016 | Sukumar | G06F 3/04186 |
| 9,596,568 | B1* | 3/2017 | Keller | H04N 21/4223 |
| 2005/0204006 | A1* | 9/2005 | Purcell | H04L 51/212 709/206 |
| 2006/0242708 | A1* | 10/2006 | Oswall | G06Q 10/107 726/24 |
| 2007/0203993 | A1* | 8/2007 | Cai | H04L 51/212 709/228 |
| 2007/0233460 | A1* | 10/2007 | Lancaster | G06F 40/211 704/9 |
| 2008/0141293 | A1* | 6/2008 | Blanchard | H04N 21/4753 348/E5.002 |
| 2008/0160984 | A1* | 7/2008 | Benes | H04M 1/72457 455/419 |
| 2009/0061928 | A1* | 3/2009 | Lee | G06F 3/0362 455/556.1 |
| 2017/0149795 | A1* | 5/2017 | Day, II | H04W 4/02 |
| 2017/0185227 | A1* | 6/2017 | Liao | G06F 3/04186 |

(Continued)

Primary Examiner — Muhammad Adnan
(74) Attorney, Agent, or Firm — Puya Partow-Navid

(57) ABSTRACT

A method for filtering content at a user equipment (UE) includes displaying, at a first time period via a display associated with the UE, first content, the first content being displayed in response to an input received from an ego person using the UE. The method also includes determining, via one or more sensors associated with the UE, a neighboring person is within proximity of the UE. The method further includes filtering the first content to prevent second content that satisfies filtering criteria from being displayed at the display in accordance with determining the neighboring person is within the proximity of the UE.

20 Claims, 13 Drawing Sheets

(56) References Cited

U.S. PATENT DOCUMENTS

2017/0354845 A1\* 12/2017 Williams .................. A61B 5/00
2018/0337870 A1\* 11/2018 Schubert ............... H04L 51/212

\* cited by examiner

CONTENT FILTERING AT A USER EQUIPMENT (UE)

CROSS-REFERENCE TO RELATED APPLICATION

The present application is a continuation of U.S. patent application Ser. No. 17/518,585, filed on Nov. 3, 2021, and titled "IMPACT AVOIDANCE AND WARNING SYSTEM," which claims the benefit of U.S. Provisional Patent Application No. 63/109,155, filed on Nov. 3, 2020, and titled "IMPACT AVOIDANCE AND WARNING SYSTEM," the disclosures of which are expressly incorporated by reference in its entirety.

BACKGROUND

Field

Certain aspects of the present disclosure generally relate to filtering content at a user equipment (UE).

Background

Autonomous agents (e.g., vehicles, robots, drones, etc.) and semi-autonomous agents use machine vision for analyzing areas of interest in a surrounding environment. Machine vision systems may provide a 3D view of the environment that surrounds an autonomous agent.

In operation, autonomous agents may rely on a trained convolutional neural network (CNN) to identify objects within areas of interest in an image of a surrounding environment. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent. Object detection applications for autonomous agents may analyze sensor image data for detecting objects (e.g., pedestrians, cyclists, other cars, etc.) in the surrounding scene from the autonomous agent. In some examples, object detection applications may identify an object that may collide with a vehicle. As an example, a vehicle traveling in front of an ego vehicle may cause a rock on the road to travel in the air and then collide with the vehicle. Some systems may predict that an object is within range of the ego vehicle and generate a warning.

SUMMARY

In one aspect of the present disclosure, a method for preventing a collision at a vehicle includes identifying an object within a path of the vehicle. The method further includes estimating a time of a collision between the object and the vehicle based on identifying the object. The method still further includes discharging a substance from one or more exterior locations of the vehicle prior to the estimated time of the collision.

Another aspect of the present disclosure is directed to an apparatus including means for identifying an object within a path of the vehicle. The apparatus further includes means for estimating a time of a collision between the object and the vehicle based on identifying the object. The apparatus still further includes means for discharging a substance from one or more exterior locations of the vehicle prior to the estimated time of the collision.

In another aspect of the present disclosure, a non-transitory computer-readable medium with non-transitory program code recorded thereon is disclosed. The program code is executed by a processor and includes program code to identify an object within a path of the vehicle. The program code further includes program code to estimate a time of a collision between the object and the vehicle based on identifying the object. The program code still further includes program code to discharge a substance from one or more exterior locations of the vehicle prior to the estimated time of the collision.

Another aspect of the present disclosure is directed to an apparatus of a vehicle comprising a processor; a memory coupled with the processor; and instructions stored in the memory and operable, when executed by the processor, to cause the apparatus to identify an object within a path of the vehicle. Execution of the instructions further cause the apparatus to estimate a time of a collision between the object and the vehicle based on identifying the object. Execution of the instructions further cause the apparatus to discharge a substance from one or more exterior locations of the vehicle prior to the estimated time of the collision.

In one aspect of the present disclosure, a method for performing an action based on a user input includes generating a notification that overlaps, at least partially, an item displayed on a display unit. The method further includes receiving a user input at the notification. The method still further includes determining whether the user input was intended for the notification or the item. The method also includes performing an action associated with the user input based on determining whether the user input was intended for the notification or the item.

In one aspect of the present disclosure, a method for filtering content includes generating content to be displayed, to a first user, via a display unit. The method further includes identify a second user in proximity to the display unit. The method still further includes filter content to be displayed, to the first user, via the display unit based on identifying the second user.

In one aspect of the present disclosure, a method for filtering contacts includes receiving, at a UE, a communication. The method further includes determining whether a person that initiated the communication is associated with a contact on a list of contacts. The method still further includes refraining from generating a notification associated with receiving the communication based on the person being associated with the contact on the list of contacts.

Aspects generally include a method, apparatus, system, computer program product, non-transitory computer-readable medium, user equipment, base station, wireless communication device, and processing system as substantially described with reference to and as illustrated by the accompanying drawings and specification.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
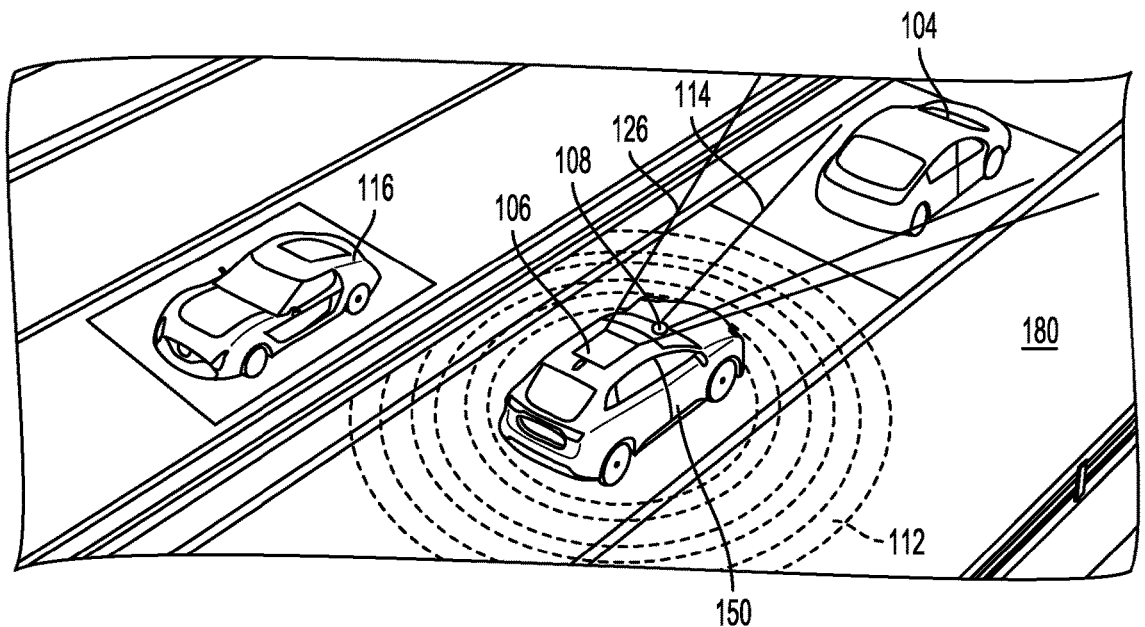
FIG. 1A illustrate an example of an agent for avoiding a collision with an object and generating a warning of an imminent collision, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As discussed, autonomous agents may rely on a machine learning model, such as a trained convolutional neural network (CNN), to identify objects within areas of interest in an image of a surrounding environment. For example, the machine learning model may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent. Object detection applications for autonomous agents may analyze sensor image data for detecting objects (e.g., pedestrians, cyclists, other cars, etc.) in the surrounding scene from the autonomous agent. In some examples, object detection applications may identify an object that may collide with a vehicle. As an example, a vehicle traveling in front of an ego vehicle may cause a rock on the road to travel in the air and then collide with the vehicle. Some systems may predict that an object is within range of the ego vehicle and generate a warning.

Conventional systems may be limited to generating a warning when an object is within a range of the ego vehicle. Such systems may fail to predict a time of impact with an object moving toward the ego vehicle. Additionally, such systems may also fail to prevent, or attempt to prevent, the collision. Various aspects of the present disclosure are directed to preventing a collision between a vehicle (e.g., ego vehicle) and an object. Specifically, some aspects are directed to an ego vehicle equipped with an object collision prevention system. In such aspects, the object collision prevent system identifies an object that is traveling toward an ego vehicle. In some examples, the object collision prevention system may also determine a velocity of the object. The velocity may be determined based on a difference between an amount of time between a first distance of the object from the ego vehicle and a second distance of the object from the ego vehicle, while also accounting for a velocity of the ego vehicle. The object collision prevention system may then determine a time of impact of the object to the vehicle based on a velocity of the object and a velocity of a vehicle. Based on determining the time of impact, the object collision prevention system may initiate protective measures based on the time of impact. The protective measures may include discharging a substance from one or more locations on the vehicle. The substance may be a liquid, a gas, or a solid.

In some examples, the object collision prevention system may be associated with a notification system. In some such examples, the notification system may filter user inputs based on a perceived intent of the user. In such examples, the notification system may display a notification on a display unit. As an example, the notification may be a warning of an imminent collision or notification that the object collision prevention system has been triggered. In some such examples, the user may provide an input on the notification. The input may be provided to dismiss the notification. Prior to receiving the user input, a new notification may be superimposed on the initial notification. The user may not have time to react to the new notification and may inadvertently provide the input on the new notification. In such examples, the notification system may determine whether the user input was intended for the initial notification or the new notification. The notification system may then initiating an action associated with the initial notification based on determining the user input was intended for the initial notification.

In some examples, an occupant of the ego vehicle may wish to keep the notifications private from other occupants. In such examples, the notification system may determine whether a second user is in proximity to a display unit and filter content when the second user is in proximity to the display unit. In some examples, the filtering may be based on a filter mode. In such examples, a list of first users may be provided to the notification system. The occupant may then enable a filter mode. Additionally, the notification system may filter the output of a message or a call from a user if the user is on the list of first users.

FIG. 1A illustrate an example of an agent 150, such as an ego vehicle, for avoiding a collision with an object and generating a warning of an imminent collision, in accordance with aspects of the present disclosure. As shown in FIG. 1A, the agent 150 may be traveling on a road 180. A first vehicle 104 may be ahead of the agent 150 and a second vehicle 116 may be adjacent to the agent 150. In this example, the 3D inference system of the agent 100 is in communication with a 2D camera 108, such as a 2D RGB camera, and a LIDAR sensor 106. The 2D camera 108 and the LIDAR sensor 106 may be integrated with the agent 150. Other sensors, such as RADAR and/or ultrasound, are also contemplated. Additionally, or alternatively, the agent 100 may include one or more additional 2D cameras and/or LIDAR sensors. For example, the additional sensors may be side facing and/or rear facing sensors. In one configuration, the 2D camera 108 captures a 2D image that includes objects in the 2D camera's 108 field of view 114. The LIDAR sensor 106 may generate one or more output streams 122, 124.

Figure 1B:
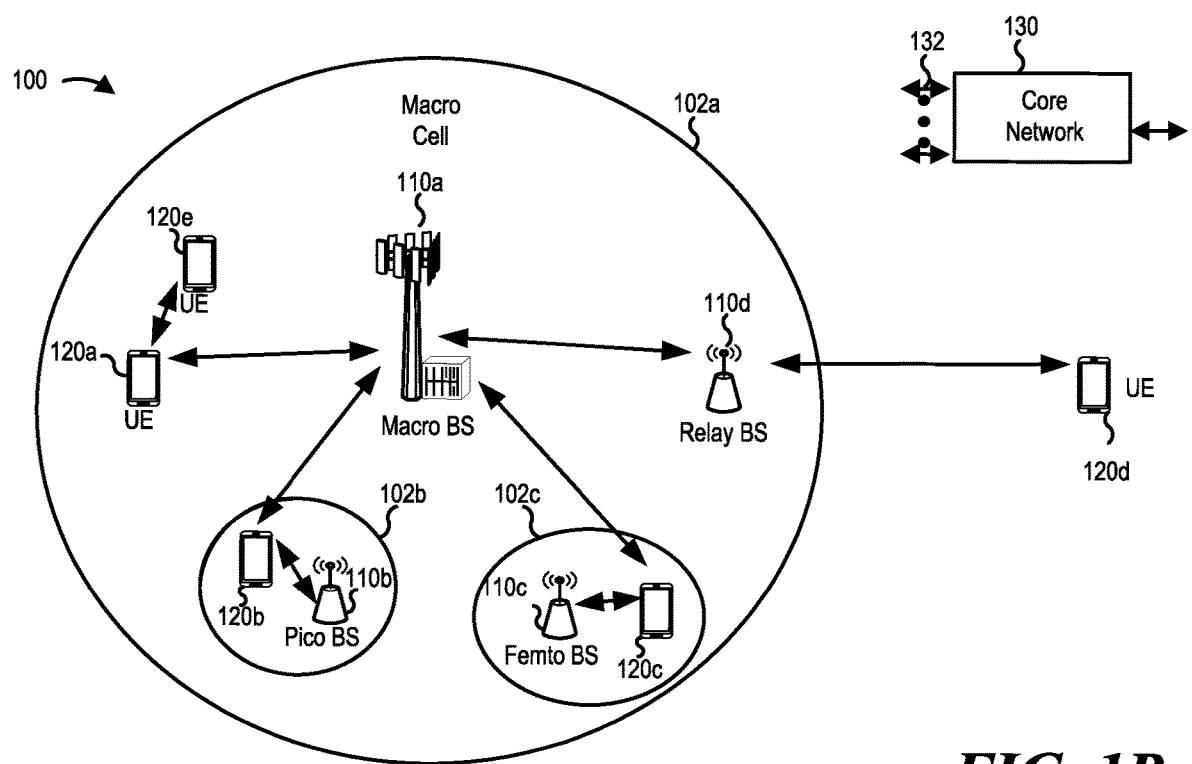
FIG. 1B is a diagram illustrating a network in which aspects of the present disclosure may be practiced.

The agent 150 may include one or more wireless communication radios, such as a cellular communication radio. FIG. 1B is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a module 140. For brevity, only one UE 120d is shown as including the module 140. The module 140 may [this section will mirror the claims and will be updated after the review of the specification].

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
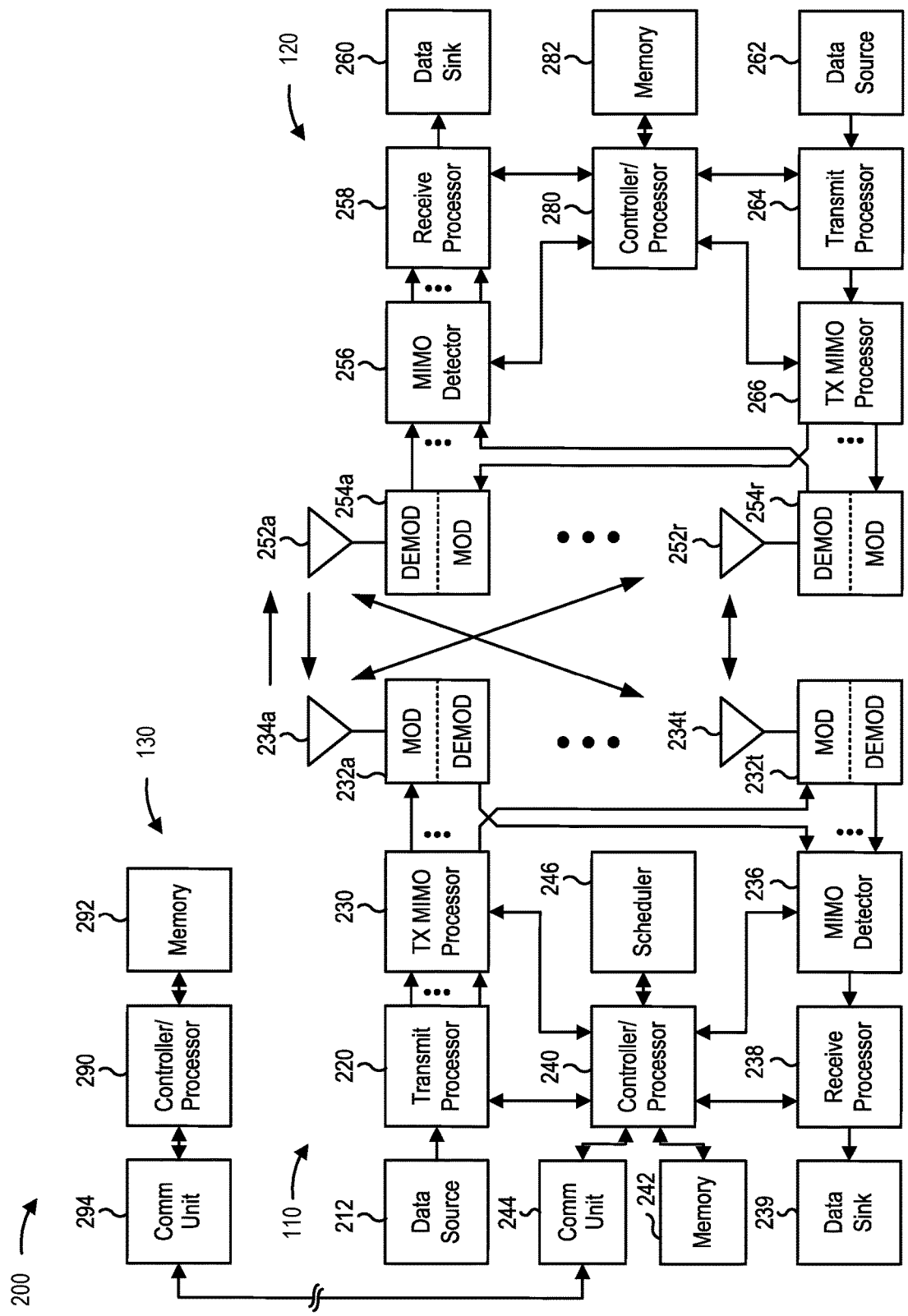
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode)

the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with polar code encoding as described in more detail elsewhere. For example, the controller/processor 240 of the base station 110, the controller/processor 280 of the UE 120, and/or any other component(s) of FIG. 2 may perform or direct operations of, for example, the processes of FIGS. 12 and 13 and/or other processes as described. Memories 242 and 282 may store data and program codes for the base station 110 and UE 120, respectively. A scheduler 246 may schedule UEs for data transmission on the downlink and/or uplink.

Figure 3A:
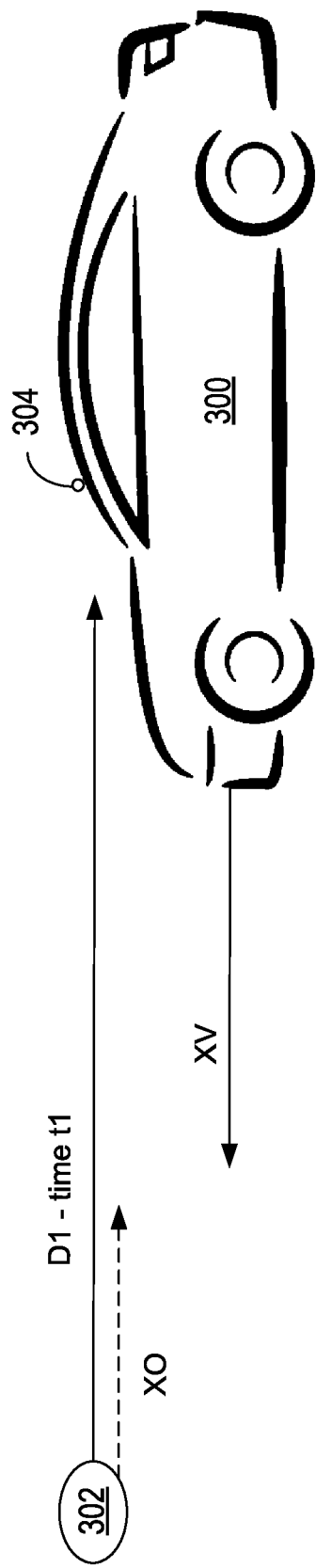
FIG. 3A is a block diagram illustrating an example of an object traveling toward an ego vehicle, in accordance with aspects of the present disclosure

As discussed, an object may travel toward an ego vehicle such that the vehicle and the object may collide. As an example, an object may fall of a vehicle in front of, or near, the ego vehicle and travel toward the ego vehicle, such that the object and the ego vehicle eventually collide. FIG. 3A is a block diagram illustrating an example of an object 302 traveling toward an ego vehicle 300, in accordance with aspects of the present disclosure. In the example of FIG. 3A, at time t1, a sensor 304 of the ego vehicle 300 detects the object 302 at a distance D1 from the ego vehicle 300. The sensor 304 working in conjunction with one or more other components may determine the distance D1. The ego vehicle 300 may be an example of the agent 150 describe with reference to FIG. 1A. The sensor 304 may be an example of a 2D camera 108, LIDAR 106, or another type of sensor, such as RADAR. The vehicle 300 may be an autonomous, semi-autonomous, or non-autonomous vehicle. In some examples, the sensor 304 may determine the object 302 is in a path of the vehicle 300. Aspects of the present disclosure are not limited to one sensor 304, the vehicle 300 may be equipped with multiple sensors. At time t1, in the example of FIG. 3A, the vehicle 300 may be traveling at a velocity XV. The object 302 may be traveling at a velocity XO. At time t1, the vehicle 300 and other associated components may be unaware of the velocity XO of the object 302.

Figure 3B:
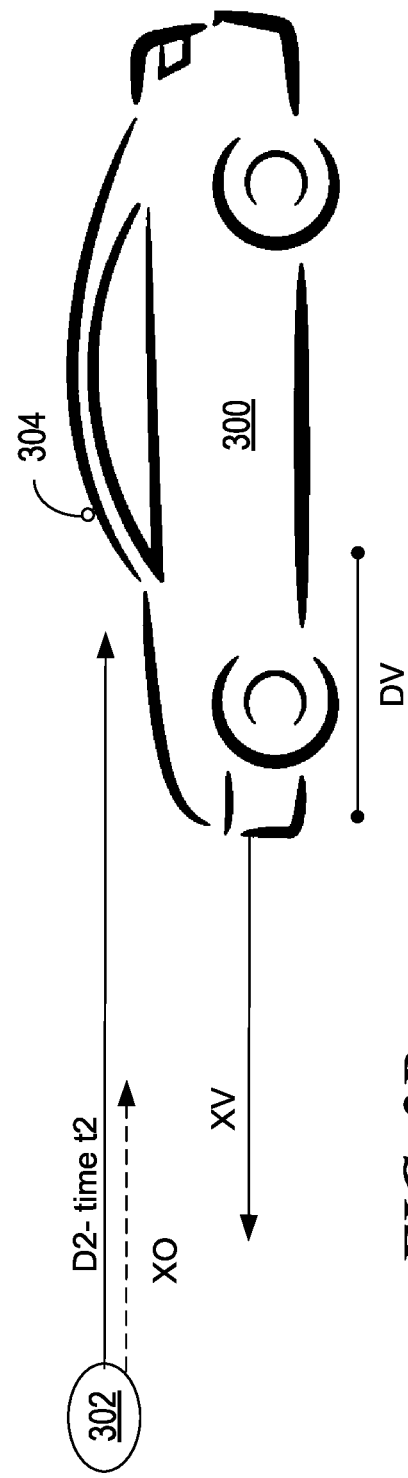
FIG. 3B is a block diagram illustrating an example of an object traveling toward an ego vehicle, in accordance with aspects of the present disclosure.

FIG. 3B is a block diagram illustrating an example of an object 302 traveling toward an ego vehicle 300, in accordance with aspects of the present disclosure. In the example of FIG. 3B, at time t2, the sensor 304 of the vehicle 300 determines the object 302 is at a distance D2 to the vehicle. At time t2, the sensor working in conjunction with one or more other components may determine the distance D2. In the example of FIG. 3B, the distance D2 is less than the distance D1, as shown in FIG. 3A, because the vehicle 300 is traveling toward the object 302 at a velocity XV and the object is traveling toward the vehicle 300 at a velocity XO.

At time t2, the vehicle 300 and/or one or more components, may determine the velocity XO of the object 302 based on the first distance D1 at time t1, the second distance D2 at time t2, and the velocity XV of the vehicle 300. The velocity XO may be determined as $((D1-D2)-DV)/(t2-t1)$. That is, the velocity XO may be the distance traveled by the object (D1-D2) over the period of time (t2-t1) while considering a distance DV travelled by the vehicle 300 over the period of time (t2-t1). The distance DV travelled by the vehicle 300 may be determined based on location sensor information, such as GPS information, a navigation sensor, an odometer, and/or other information.

After determining the velocity XO of the object, the vehicle 300 and/or one or more components, may determine an estimated collision time CT between the vehicle 300 and the object 302, assuming the vehicle 300 and the object 302 maintain their respective velocities XV and XO. The estimated collision time CT may be determined as based on a function where distance is a product of rate and time. In this example, a distance traveled by the object 302 may be a variable DTO and a distance traveled by the vehicle 300 may be a variable (D2−DTO). The rate of the object 302 is the velocity XO and the rate of the vehicle 300 is the velocity XV. A time traveled by the object 302 and the vehicle 300 may be the same and may be represented as a variable t. For the object 302, DTO=XO*t. For the vehicle 300, (D2−DTO) =XV*t. Using the substitution method, DTO may be replaced by (XO*t), such that (D2−(XO*t))=XV*t, and D2=(XV*t)+(XO*t). This may be simplified to D2=(XV+XO)*t. When solving for the time t, the equation may be t=D2/(XV+XO).

In the examples of FIGS. 3A and 3B, the distances D1 and D2 are estimated based on a distance from a windshield of the vehicle 300. The distances D1 and D2 are not limited to a distance from the windshield and may be any distance from an estimated point of contact with the vehicle 300. The point of contact may be determine based on a position of the object 302 in relation to the vehicle 300. Accordingly, the object 302 may travel toward the vehicle 300 from any direction relative to the vehicle 300, such as from a rear, side, or top. Aspects of the present disclosure contemplate preventing a potential collision from any direction.

In some examples, a time of impact TOI may be based on the current time and the estimate time until collision. For example, TOI=(current time+t). At a time prior to the time of impact, the vehicle 300 may initiate a collision prevention process (e.g., protective measures). The collision prevention process is intended to reduce a velocity XO of the object 302 and/or change a direction of travel of the object 302. As such, the collision prevention process may prevent a collision between the vehicle 300 and the object 302 or reduce a force of the collision.

Figure 3C:
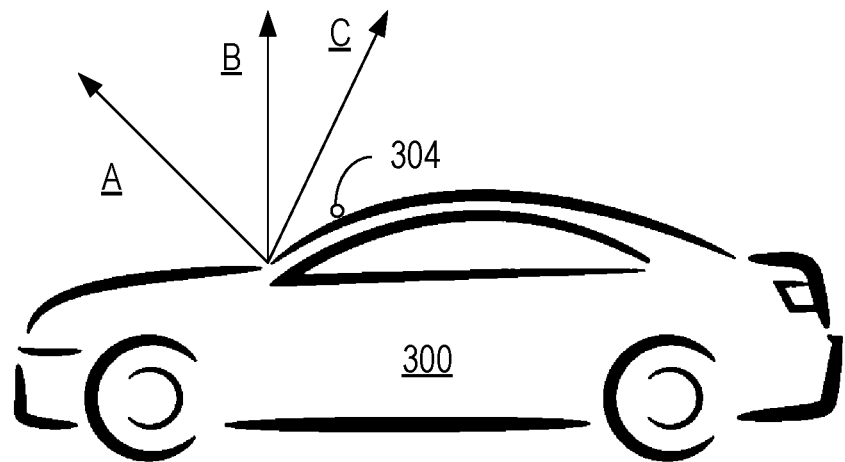
FIG. 3C is a block diagram illustrating an example of a collision prevention process, in accordance with aspects of the present disclosure.
Figure 3D:
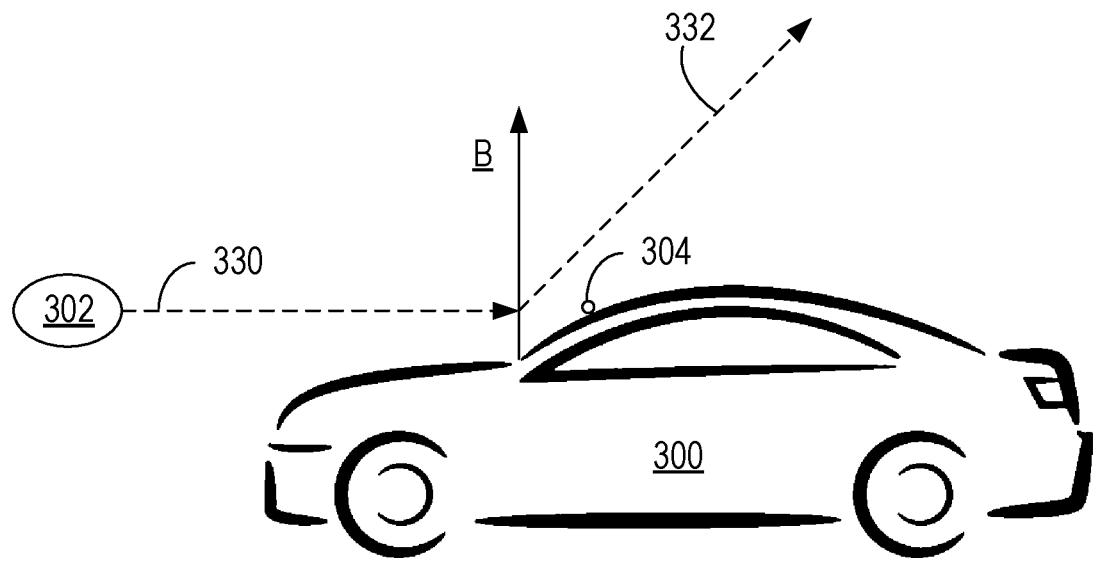
FIG. 3D, which is a block diagram illustrating an example of the collision prevention process, in accordance with aspects of the present disclosure

In some implementations, the collision prevention process causes emission of a substance from the vehicle 300. The substance may be a liquid (e.g. water), gas (e.g., air), or another type of substance (e.g., semi-solid, solid, etc.). It may be desirable to use a clear substance, such as water or air, to prevent distractions, such as a distraction to the current driver and/or surrounding drivers. FIG. 3C is a block diagram illustrating an example of a collision prevention process, in accordance with aspects of the present disclosure. As shown in FIG. 3C, the collision prevention process may emit (e.g., discharge) the substance in one or more directions, such as directions A, B, and/or C. Other directions are also contemplated. The substance(s) may be discharged at a high velocity, such that the object 302 (not shown in FIG. 3C) may veer off course when coming in contact with the substance discharged in direction A, B, and/or C. This is illustrated in FIG. 3D, which is a block diagram illustrating an example of the collision prevention process, in accordance with aspects of the present disclosure. In the example of FIG. 3D, for ease of explanation, the substance may be discharged in only direction B. Of course, the substance may be simultaneously discharged in other directions, such as direction A or C as shown in FIG. 3C. In some other examples, the discharge in the multiple directions A, B, and/or C may be staggered. In some such examples, the substance may first discharge in direction A, then direction B, then direction C. As shown in FIG. 3D, the object 302 may travel along a first path 330 toward the vehicle 330. The first path 330 of the object 302 may intersect with the discharge direction B of the substance emitted from the vehicle 302. Due to the velocity and direction of the discharge, the first path 330 may change to a second path 332, such that a collision with the vehicle 300 is prevented. In the example of FIG. 3D, the discharge direction B is perpendicular to the road (not shown in FIG. 3D), thus causing the first path 330 to change from a horizontal direction to an upward direction.

As discussed, the collision prevention system may discharge a substance, or one or more substances, such as air and/or water, in one or more directions, such as directions A, B, and/or C as shown in FIG. 3C. The discharged substance may cause the object to veer off course, thereby preventing a collision. Alternatively, the discharged substance reduce the object's velocity, thereby reducing an effect of an impact with the windshield. For example, the reduced impact may prevent the windshield from cracking.

Figure 4:
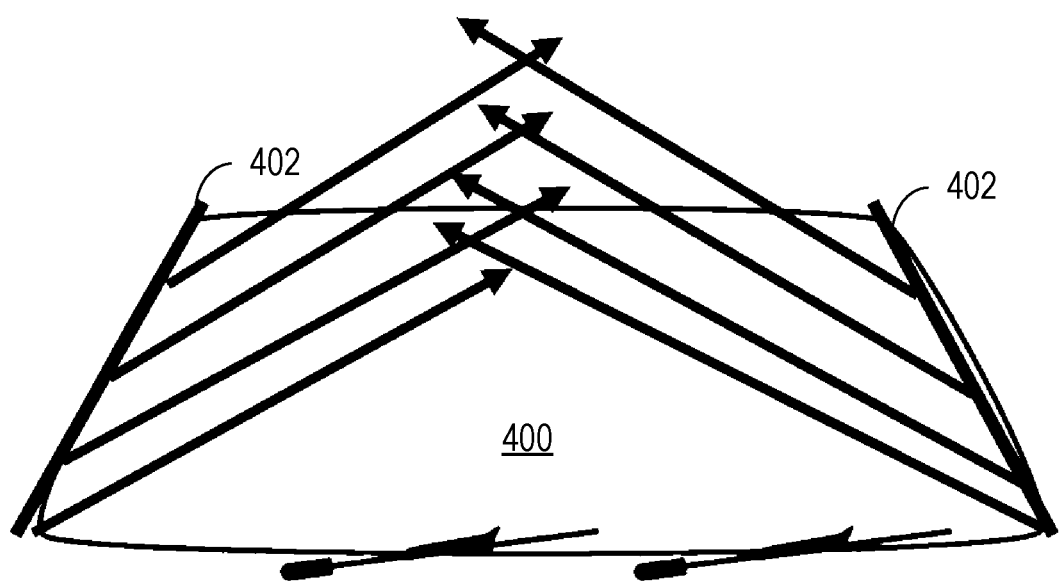
FIG. 4 is a diagram illustrating an example of discharging a substance in one or more directions, in accordance with aspects of the present disclosure.

FIG. 4 is a diagram illustrating an example of discharging a substance in one or more directions, in accordance with aspects of the present disclosure. For simplicity, the example of FIG. 4 will use air as an example of the substance. As discussed, the substance is not limited to releasing air. In some examples, the substance be released from valves defined on, or integrated with, a windshield 400. In some other examples, the valves may be adjacent to the windshield 400, or at another location on a vehicle, such as the vehicle 300 or 150 as described in FIGS. 3 and 1, respectively. In the example of FIG. 4, the valves (not shown in FIG. 4) may be defined on vertical pillars 402 of the vehicle that support the windshield. The windshield may be integrated with the vehicle. In some other examples, the valves may be integrated with the window frame or the body of the vehicle. Because the windshield 400 may curve, the valves may release the substance at an upward angle (shown by the arrows of FIG. 4) towards a center of the windshield 400. For example, the substance may be released at a 45 degree angle, relative to the pillar 402. In one configuration, the substance is released with enough pressure such that the blast of substance a valve on one pillar 402 intersects with a blast of the substance on a valve of another pillar 402. The valves may be connected to one or more compressors located in the vehicle. Additionally, or alternatively, an electric pump may be used to discharge the substance from the valves. The valves may be electronically controlled to change a direction of the discharge based on a direction of approach of an object to the vehicle and/or current conditions, such as current wind conditions or weather conditions (e.g., snow, rain, heat). In some example, some valves may face a different direction than other valves on a same pillar 402 and/or another pillar 402. In some examples, the substance may be released in one or more other directions, such as horizontally and/or vertically. Additionally, or alternatively, the substance may be released from other sections of the vehicle, such as the hood, front grill, roof, bumper, etc.

Figure 5:
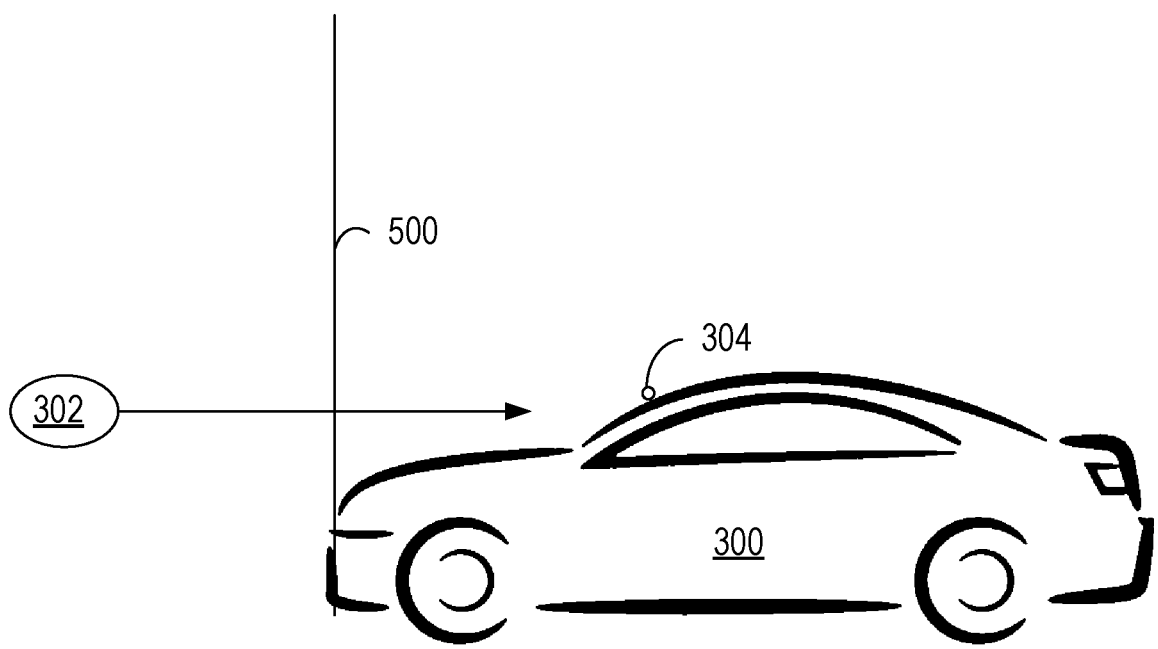
FIG. 5 is a diagram illustrating an example of initiating a collision prevention system, in accordance with aspects of the present disclosure.

In some examples, the collision prevention system may be initiated at a pre-determined time, or based on a trigger, before the time of impact. The collision prevention system may be maintained on the object impacts the vehicle or after the collision is avoided. FIG. 5 is a diagram illustrating an example of initiating a collision prevention system, in accordance with aspects of the present disclosure. In some examples, to account for variances in calculating the time of impact, the collision prevention system may initiate at a time before the time of impact, such a time of impact t–n, where the parameter n is a pre-determined time. In some examples, the parameter n is based on an average variance. Additionally, or alternatively, the collision prevention system may initiate based on a trigger, such as when the object 302 crosses a boundary 500, such as a forward vertical plane of the vehicle 300. The protective measures may initiate when a distance of an object from the boundary 500 is less than a threshold or when the object crosses the boundary 500. Aspects of the present disclosure are not limited to the boundary 500 of FIG. 5, other boundaries may be established around the vehicle. In one configuration, a boundary surrounds the entire vehicle 300.

As discussed, an occupant of the vehicle, such as the driver and/or passenger, may be warned at a time when the collision prevention system is initiated or prior to initiation. The warning may prevent the driver from being startled by the discharge of the one or more substance. In some examples, the warning may be generated and output when the vehicle is operating in a manual or semi-autonomous mode. In some such examples, the warning is also provided when the vehicle is operating in an autonomous mode to prevent the occupants from being startled. In some examples, the system determines the vehicle's operating mode and generates a warning based on the operating mode. For example, the warning may be limited to the manual or semi-autonomous mode. The warning may be output at one or both of a user device, such as a UE 120 that is in communication with the vehicle, or a device integrated with the vehicle.

Figure 6A:
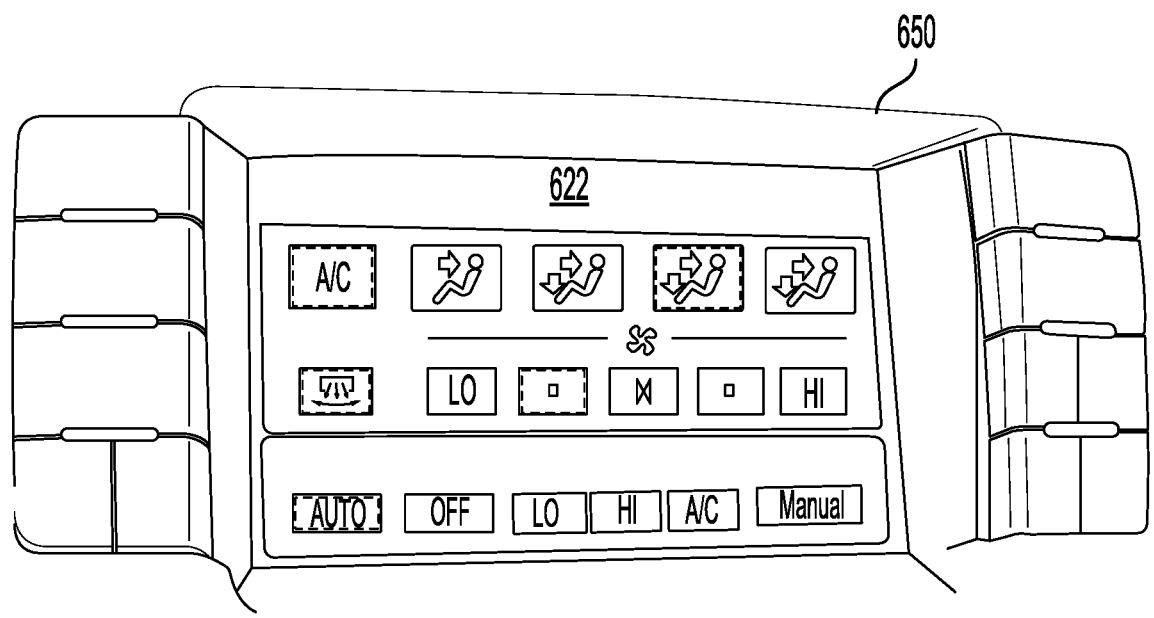
FIG. 6A illustrates an example of an interfaces of a vehicle, in accordance with aspects of the present disclosure.

FIG. 6A illustrates an example of an interfaces 650 of a vehicle, in accordance with aspects of the present disclosure. In the example of FIG. 6A, the interface 650 includes a touchscreen 622 that may be dynamically updated. In the current example, the touchscreen 622 displays climate control information. The touchscreen 622 may be dynamically updated to display other information, such as navigation information, entertainment information, and/or warnings. In some examples, a warning may be displayed as a pop-up window, a top banner, a bottom banner, and/or another type of notification.

In some examples, the warning (e.g., notification) may be displayed via an in-vehicle display system, such as the touchscreen 622 of FIG. 6A. As discussed, the notification may be a pop-up and/or a banner. In some examples, the notification may be displayed while the user is interacting with the touchscreen 622. For example, the user may be in the process of providing an input to the touchscreen 622 when the notification is displayed. In this example, the user may accidently touch (e.g., provide an input) the notification rather than an intended icon/menu item. As such, it is desirable to improve notification systems to account for unintended inputs. Aspects of the present disclosure discussed with reference to notifications and/or an in-vehicle display system are not limited to the in-vehicle display system, such aspects are also contemplated for other devices with displays, such as a mobile device. The mobile device may be an example of a UE 110 described with reference to FIGS. 1B and 2.

Figure 6B:
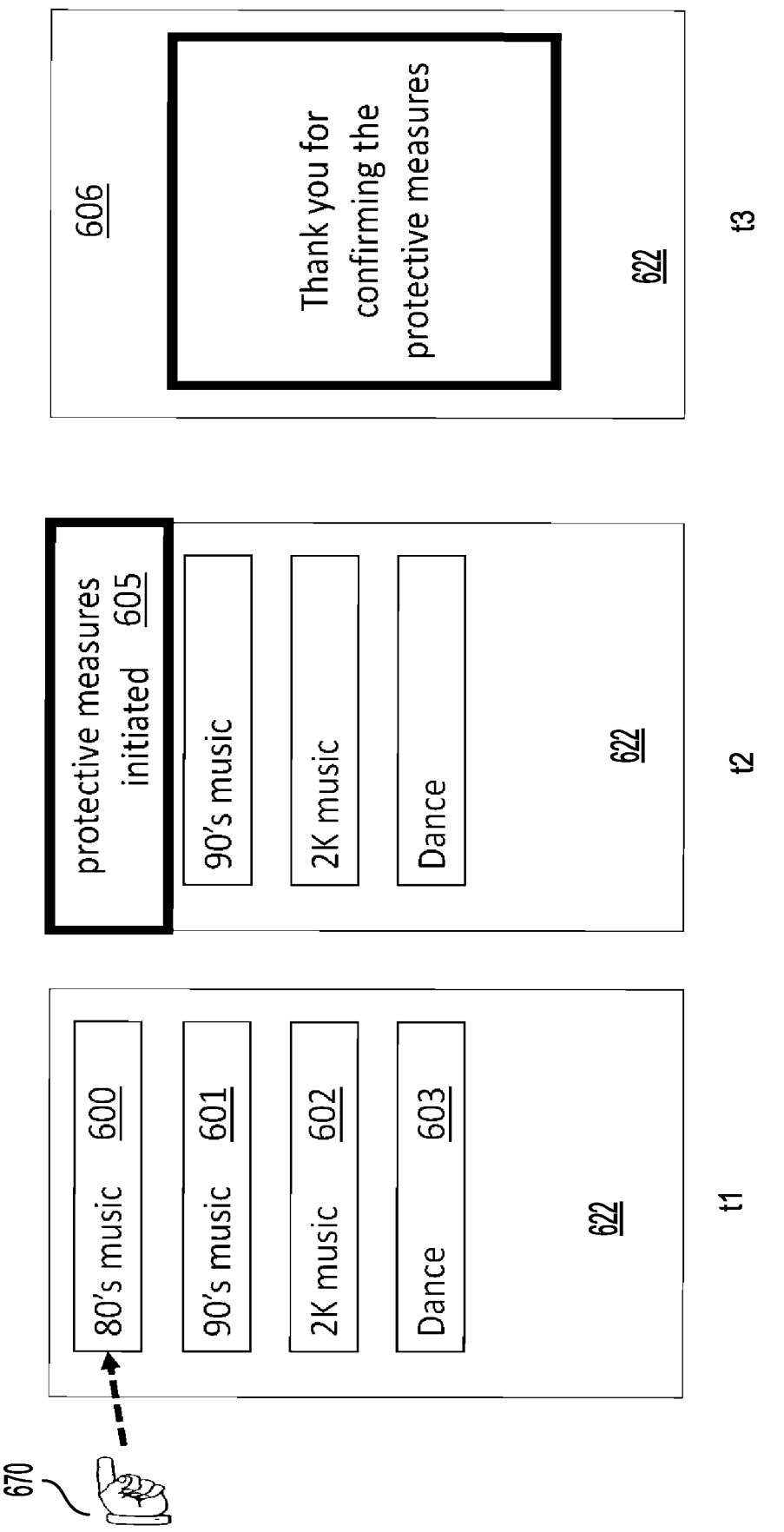
FIG. 6B is a diagram illustrating an example of a conventional notification system.

FIG. 6B is a diagram illustrating an example of a conventional notification system. As shown in FIG. 6B, a list of items 600, 601, 602, 603 may be displayed on the touchscreen display 622. At time t1, a user may attempt to select one of the items 600, 601, 602, 603 via a touch input 670. In some cases, at time t2, at a time prior to the user providing the touch input 670 on the display 622, a notification 605 is displayed and overlaps with the 80's music menu item 600. The user may not have sufficient time to react to the notification 605 and the user inadvertently selects the notification 605. The notification 605 may be a type of notification that may be selected via the touch input 670, may be dismissed via a swipe motion (e.g., swipe up), or may be dismissed if an input is not received after a period of time. In the example of FIG. 6B, at time t3, a notification confirmation 606 is displayed based on the user input 670. In such an example, the notification confirmation 606 is displayed rather than the system performing a function corresponding to the intended menu item 600, such as tuning a radio to the 80's music channel associated with the 80's music menu item 600. It may be desirable to prevent the system from responding to an inadvertent touch.

In some implementations, when an input is received on a notification, the system predicts if the input is intended for the notification or a menu item displayed underneath the notification (e.g., an menu item covered by the notification). A menu item refers to a screen element, such as an icon, hyperlink, button, a scrollable page, etc., that may receive a touch input or another input, such as a mouse click. In some examples, when a notification is displayed, the system (e.g., a processor associated with the device) may determine if the notification partially or fully overlaps an existing menu item. In the previous example, "80's music" is an input item that exists under the notification. That is, when the notification was displayed, the notification was placed over the "80's music" icon. In some aspects, the system does not process an input on a notification if the notification overlaps a menu item. The system may wait for a second input on the notification and then process the second input, where the second input confirms the user's intent to select the notification.

As discussed, a menu item may be a scrollable page. In some examples, the user may have been providing an input to scroll through a displayed page (e.g., graphical user interface (GUI)). For example, the user may have provided N inputs to scroll through the page and the notification may appear before the user provides the N+1 input for scrolling. The user may inadvertently select the notification when intending to provide the N+1 input for scrolling. In conventional systems, rather than scrolling, the notification item is initiated. According to aspects of the present disclosure, the system may ignore the input on the notification based on the previous activity. The system may continue to scroll or wait for a subsequent input.

That is, in some system may also monitor the user's previous activity. For example, the user may have navigated to the list of stations and may be scrolling through the list. As such, the system may determine that the user was intending to continue scrolling through the list or intending to select the 80's music icon. In some aspects, the system may ignore the input on the notification based on the user's prior activity. In some such aspects, the system may wait for a second input on the notification and then process the second input, where the second input confirms the user's intent to select the notification. The system may also learn how often the user selects specific notifications. For example, the user may respond to text message notifications and may ignore news flashes.

In some examples, the notification may overlap multiple menu items. In some such examples. In some such examples, the system may process the input for the menu item corresponding to the location of the input at the notification. The system may determine a proximity of a mouse or input device (e.g., finger) to the menu item before the notification was displayed. If the distance is less than a threshold, the system may ignore the input on the notification and proceeds as though the user intended to select the menu item.

According to various aspects of the present disclosure, when an input is at a notification that overlaps one or more menu items, the system may react in one or more ways, such as: ignore the input on the notification and wait for a subsequent input; ignore the input and dismiss the notification; accept the input on the notification and take an action on the input on the notification; or process the input as if the input was provided for the icon beneath the notification.

Figure 7:
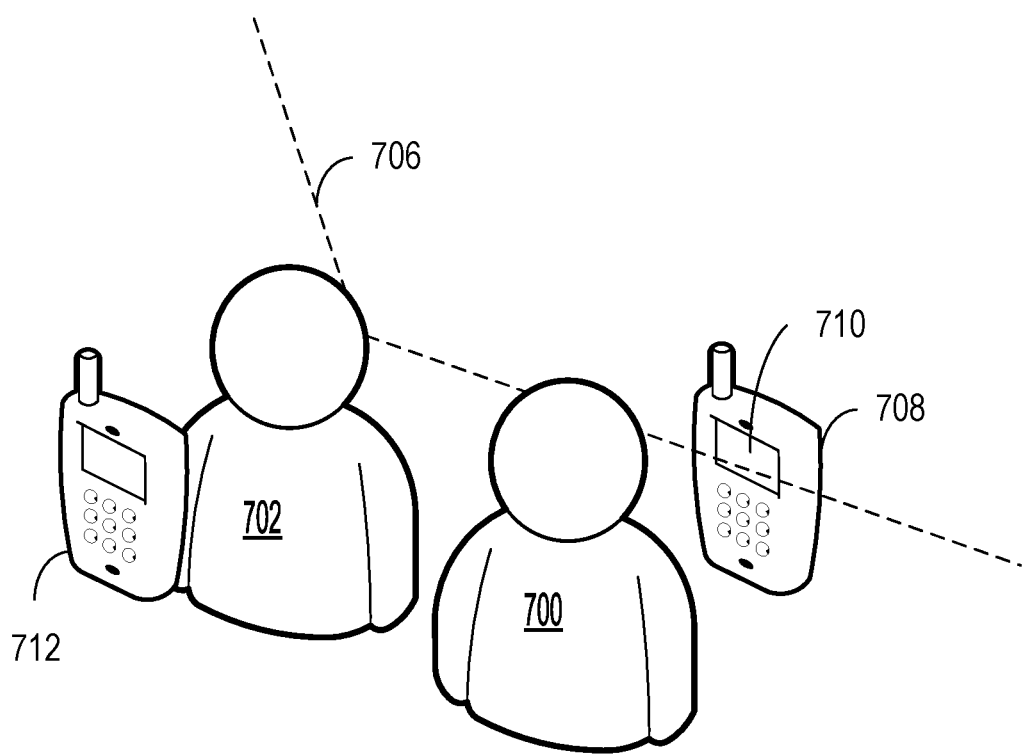
FIG. 7 is a diagram illustrating an example of one or more users near a display.

In some examples, one or more people may be near a display of a device associated with an ego person. FIG. 7 is a diagram illustrating an example of one or more users near a display. In the example of FIG. 7, an ego person 700 may be using a device 708 that includes a display 710. The device 708 may be a UE, such as a UE 110 described with reference to FIGS. 1 and 2, an interference of a vehicle, such as the interface 650 described with reference to FIG. 6A, or another type of device. Additionally, the ego person 700 may be adjacent to a neighboring person 702, and the display 710 may be within a field of view 706 of the neighboring person 702, such that the neighboring person 702 may view the content on the display 710. In some examples, the ego person 700 may not want the neighboring person 702 to see certain content. For example, the ego person 700 may be browsing the Internet and does not want their child (e.g., neighboring person 702) to view inappropriate content. Presence of the neighboring person 702 may be dynamic, that is, the neighboring person 702 may appear without warning. Therefore, the target user 700 may not have time to scroll away or change content displayed at the device 708. Additionally, or alternatively, the user may be browsing social media and may not be in control of some of the displayed content. It is desirable to filter content when one or more additional persons 702 are present. The additional user 702 may be a pre-determined person (e.g., a person associated with a group of persons, such as children).

In some aspects, a sensor associated with the device 708 may identify the presence of the neighboring person 702. In some examples, the presence may be determined from one or more of a forward facing camera, rear facing camera, side camera, or other image capturing device. Additionally, or alternatively, the presence may be determined based on communications a device 712 of the neighboring person 702. For example, the device 708 associated with the ego person 700 determine the proximity of the device 712 associated with the neighboring person 702 based on near-field communications, or other types of communications.

When presence of the neighboring person 702 is confirmed, the ego person's device 708 may filter any content that satisfies filtering criteria. The filtering criteria may be based on whether the content is inappropriate or content flagged for filtering by the ego person 700. The inappropriate content may be flagged by a third-party, such as a content flagging entity. Additionally, or alternatively, inappropriate content may be flagged by the ego person 700. For example, the target user may set lewd images, gore, and violence as inappropriate. A machine learning model may be trained to identify content that is inappropriate and content that is not inappropriate.

As an example, at a time t1, the ego person 700 may be browsing social media and the content may not be filtered because the neighboring person 702 may not be present. At a time t2, the device 708 determines the neighboring person 702 may be in proximity to the device 708. As discussed, the proximity may be determined based on identifying the neighboring person 702 via one or more sensors, such as an image sensor, and/or based on detecting a device 712 associated with the neighboring person 702. The device 712 may be detected based on one or more communication methods, such as near field communication, short-wave communication, or other types of device-to-device communication. In response to determining the neighboring person 702 may be in proximity to the device 708, the device 708 may initiate content filtering for content displayed and/or output at the device 708 until the neighboring person 702 is no longer in proximity. The proximity may be a distance that is less than a threshold. The ego person 700 may also disable content filtering while the neighboring person 702 is in proximity The device may filter content based on a user type. For example, if the device identifies a child, a first set of content is filtered. If the device identifies another adult, a second type of content is filtered. The user type may be identified by the sensor (e.g., camera) or the device of the other user. The filtering is not limited to content displayed on a display unit, the content may include other content, such as audio. The content on the display unit may include text message, emails, and/or other types of content.

Figure 8:
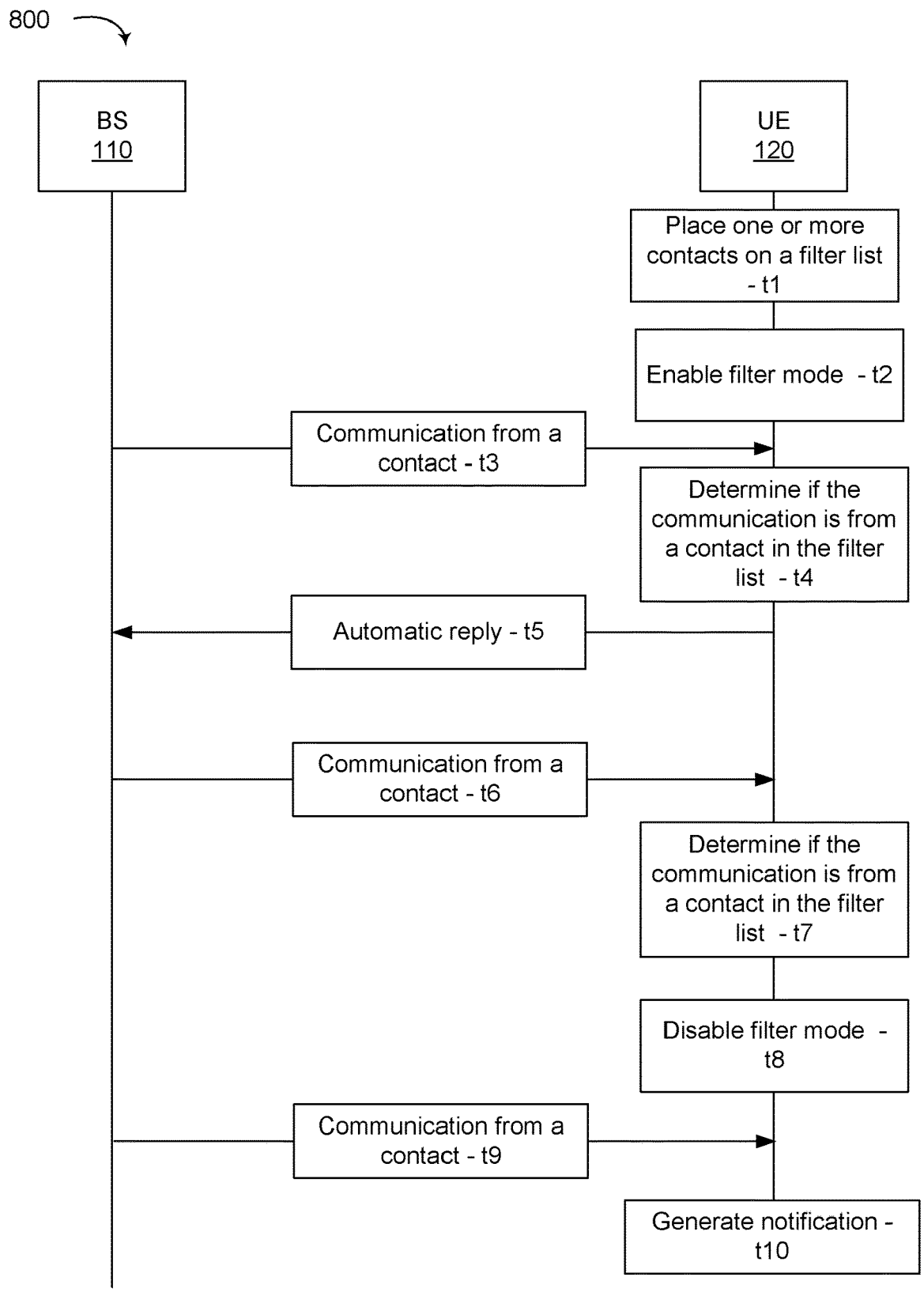
FIG. 8 is a timing diagram illustrating an example of filtering communications based on a user, in accordance with aspects of the present disclosure.

In some aspects, in addition to, or alternate from filtering based on an identified other user, the device may filter content based on a filter mode selected by the user. FIG. 8 is a timing diagram illustrating an example 800 of filtering communications based on a user, in accordance with aspects of the present disclosure. For ease of explanation, the example 800 is described with reference to a UE 120. Still, aspects discussed with reference to FIG. 8 are not limited to the UE 120 and may be implemented on another device, such as an interface of a vehicle, such as the interface 650 described with reference to FIG. 6A. As shown in FIG. 8, at time t1, a user places one or more contacts (e.g., other users) on a filter list (e.g., a list of filtered users). At time t2, the user enables the filer mode. When the user enables the filter mode, messages and calls from a contact in the list of filtered users are not output on the device. Still, messages and calls from users not in the list may be output. For example, a user's ex-girlfriend may be in the list of filtered users and the user's mother is not on the list. When on a date, the user may enable the filter mode. During the date, the user may receive calls or text messages from the mother but may not receive calls or messages from the ex-girlfriend.

As shown in FIG. 8, at time t3, the user receives a communication from a contact. At time t4, the UE 120 determines if the communication is from a contact in the filter list. In some examples, if the communication is from a contact in the filter list, the communication may be ignored and a notification is not generated at the UE 120. In some other examples, the notification is not generated at the UE 120 and the UE 120 automatically responds to the contact when the filter mode is enabled (time t5). Continuing from the example above, when the filtered mode is enabled, a text message from the ex-girlfriend may be filtered. That is, the text message is received, however, the device does not display any notifications related to the text message. In one configuration, the text message is marked as read. Additionally, the text may not show up in the list of received texts until the user disables the filter mode. Still, so as not to raise suspicion by the sender of the text, the device may automatically respond. For example, the ex-girlfriend's text may be "hi, how are you?" The response may be "good, how are you?" or "good, at the gym right now, I'll message you later." The responses may be time and location based. For example, if the user usually goes to the gym between 6 PM-8 PM, the responses may reference the gym if the filter mode is enabled between 6 PM-8 PM. Otherwise, the responses may not include gym responses.

The responses may also be trained on communications between the owner of the device and the users on the list. For example, the user's ex-girlfriend may be on the list and the user's boss may be on the filter list. The system may learn that the user refers to his ex-girlfriend as "honey" and his boss as "chief". The responses may be tailored based on the learned communications. For example, an automatic response to the ex-girlfriend may be "sorry honey, can't talk right now, I'll message you later." As another example, the automatic response to the boss may be "sorry chief, I'm unavailable, I will get back to you ASAP!" A machine learning model may be implemented to learn the user's communication style with filtered users. The automatic responses may be closed ended so as not to carry on a conversation.

In some cases, the user may be in vicinity to a filtered user. If a filtered user is in proximity to the device, the device may allow a message or call from the filtered user to be displayed. The proximity may be determined based on location sharing, proximity sensors, or other types of proximity detection.

As shown in FIG. 8, at time t6, the UE 120 receives another communication from a contact. At time t7, the UE 120 determines if the communication from a contact in the filter list. In this example, the communication is not from a contact in the filter list. Therefore, the UE 120 may generate a notification, such as a ring or a vibration. At time t8, the user may disable the filter mode. At time t9, the UE 120 receives a communication from a contact. At time t10, the UE 120 generates a notification to alert the user of an incoming communication. The notification may be generated regardless of the source (e.g., contact) of the communication because the filter mode is disabled (time t8).

Figure 9:
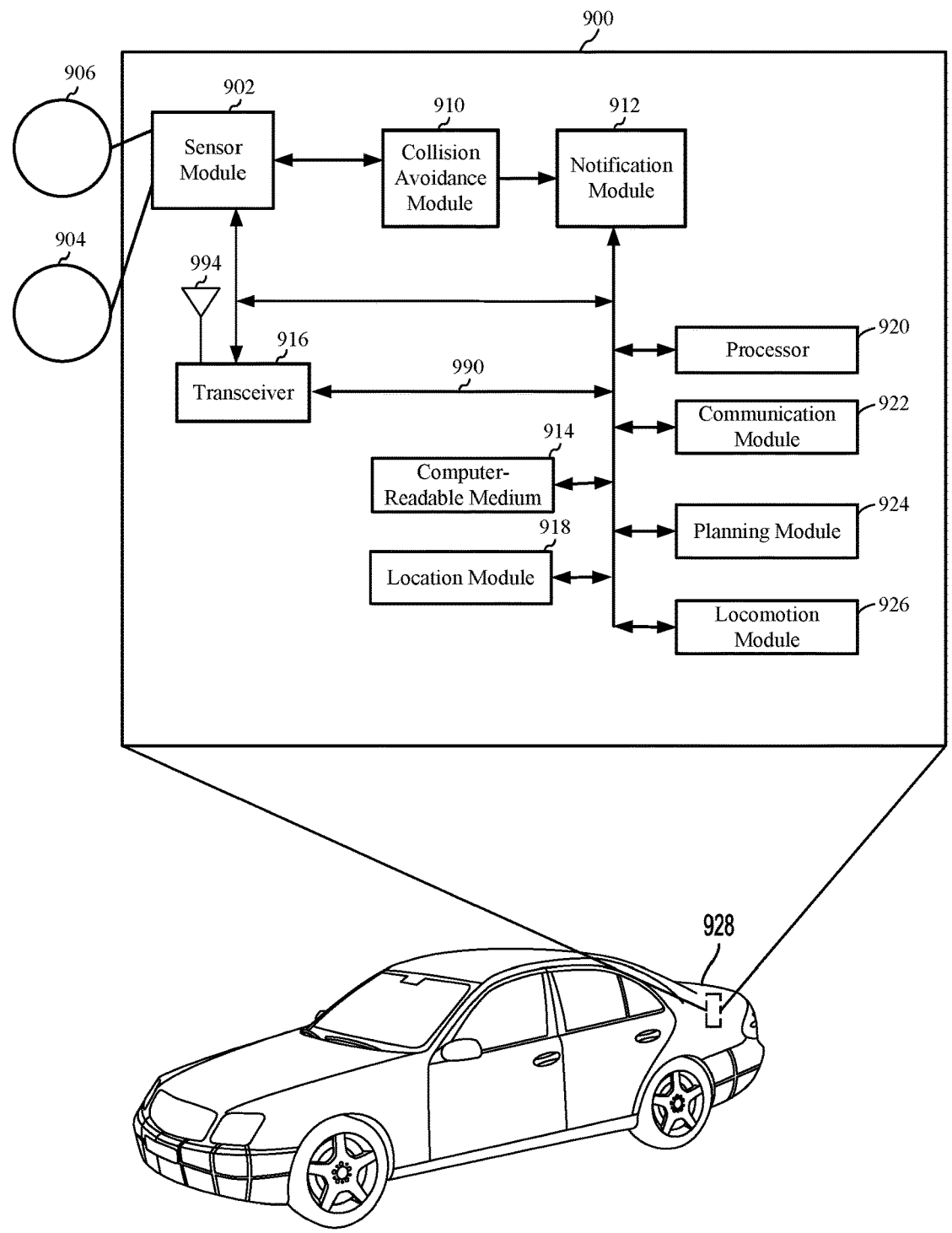
FIG. 9 is a diagram illustrating an example of a hardware implementation for a control system of a vehicle, in accordance with aspects of the present disclosure.

FIG. 9 is a diagram illustrating an example of a hardware implementation for a control system 900 of a vehicle 928, in accordance with aspects of the present disclosure. The control system 900 may support one or more of collision avoidance, message filtering, user input interpretation, and user filtering as discussed in various aspects of the present disclosure. The vehicle 928 may be an example of a vehicle 150 or 300 described with reference to FIGS. 1A, 3A, 3B, 3C, and 3D. Aspects of the present disclosure are not limited to the vehicle control system 900 being a component of the vehicle 928, as other devices, such as a bus, boat, drone, or robot, are also contemplated for using the vehicle control system 900. The vehicle 928 may be autonomous or semi-autonomous. In some examples, the control system 900 is configured to perform operations, including operations of one or more of the process 1000, 1100, 1200, or 1300 described below with reference to FIGS. 10, 11, 12, and 13.

The vehicle control system 900 may be implemented with a bus architecture, represented generally by a bus 990. The bus 990 may include any number of interconnecting buses and bridges depending on the specific application of the vehicle control system 900 and the overall design constraints. The bus 990 links together various circuits including one or more processors and/or hardware modules, represented by a processor 920, a communication module 922, a location module 918, a sensor module 902, a locomotion module 926, a navigation module 924, and a computer-readable medium 914. The bus 990 may also link various other circuits such as timing sources, peripherals, voltage regulators, and power management circuits, which are well known in the art, and therefore, will not be described any further.

The vehicle control system 900 includes a transceiver 916 coupled to the processor 920, the sensor module 902, a comfort module 908, the communication module 922, the location module 918, the locomotion module 926, the navigation module 924, and the computer-readable medium 914. The transceiver 916 is coupled to an antenna 444. The transceiver 916 communicates with various other devices over a transmission medium. For example, the transceiver 916 may receive commands via transmissions from a user or a remote device. As another example, the transceiver 916 may transmit driving statistics and information from the comfort module 908 to a server (not shown).

The vehicle control system 900 includes the processor 920 coupled to the computer-readable medium 914. The processor 920 performs processing, including the execution of software stored on the computer-readable medium 914 providing functionality according to the disclosure. The software, when executed by the processor 920, causes the vehicle control system 900 to perform the various functions described for a particular device, such as the vehicle 928, or any of the modules 902, 914, 916, 918, 920, 922, 924, 926. The computer-readable medium 914 may also be used for storing data that is manipulated by the processor 920 when executing the software.

The sensor module 902 may be used to obtain measurements via different sensors, such as a first sensor 906 and a second sensor 904. The first sensor 906 may be a vision sensor, such as a stereoscopic camera or a red-green-blue (RGB) camera, for capturing 2D images. The second sensor 904 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 904, 906. The measurements of the first sensor 906 and the second sensor 904 may be processed by one or more of the processor 920, the sensor module 902, the communication module 922, the location module 918, the locomotion module 926, the navigation module 924, in conjunction with the computer-readable medium 914 to implement the functionality described herein. In one configuration, the data captured by the first sensor 906 and the second sensor 904 may be transmitted to an external device via the transceiver 916. The first sensor 906 and the second sensor 904 may be coupled to the vehicle 928 or may be in communication with the vehicle 928.

The location module 918 may be used to determine a location of the vehicle 928. For example, the location module 918 may use a global positioning system (GPS) to determine the location of the vehicle 928. The communication module 922 may be used to facilitate communications via the transceiver 916. For example, the communication module 922 may be configured to provide communication capabilities via different wireless protocols, such as WiFi, long term evolution (LTE), 4G, etc. The communication module 922 may also be used to communicate with other components of the vehicle 928 that are not modules of the vehicle control system 900.

The locomotion module 926 may be used to facilitate locomotion of the vehicle 928. As an example, the locomotion module 926 may control movement of the wheels. As another example, the locomotion module 926 may be in communication with a power source of the vehicle 928, such as an engine or batteries. Of course, aspects of the present disclosure are not limited to providing locomotion via wheels and are contemplated for other types of components for providing locomotion, such as propellers, treads, fins, and/or jet engines.

The vehicle control system 900 also includes the navigation module 924 for planning a route or controlling the locomotion of the vehicle 928, via the locomotion module 926. In one configuration, the planning module 924 overrides the user input when the user input is expected (e.g., predicted) to cause a collision. The modules may be software modules running in the processor 920, resident/stored in the computer-readable medium 914, one or more hardware modules coupled to the processor 920, or some combination thereof. The navigation module 924 may be in communication with the sensor module 902, the transceiver 916, the processor 920, the communication module 922, the location module 918, the locomotion module 926, the planning module 924, and the computer-readable medium 914.

As shown in FIG. 9, the vehicle control system 900 may also include a collision avoidance module 910. Working in conjunction with one or more other components of the vehicle control system 900, the collision avoidance module 910 may identify an object within a path of the vehicle 928; estimate a time of a collision between the object and the vehicle 928 based on identifying the object; and cause one or more valves integrated with the vehicle 928 to discharge substance from one or more exterior locations of the vehicle 928 prior to the estimated time of the collision. The path of the vehicle 928 may be estimated based on a current trajectory, a planned route by the planning module 924, current telemetry, and/or other methods of estimating a path.

The vehicle control system 900 may also include a notification module 912. Working in conjunction with one or more other components of the vehicle control system 900, the notification module 912 may generate a notification that overlaps, at least partially, an item displayed on a display unit; receive a user input at the notification; determine whether the user input was intended for the notification or the item; and perform an action associated with the user input based on determining whether the user input was intended for the notification or the item.

Additionally, or alternatively, working in conjunction with one or more other components of the vehicle control system 900, the notification module 912 may generate content to be displayed, to a first user, via a display unit; identify a second user in proximity to the display unit; and filter content to be displayed, to the first user, via the display unit based on identifying the second user.

Additionally, or alternatively, working in conjunction with one or more other components of the vehicle control system 900, the notification module 912 may receive a communication; determine whether a person that initiated the communication is associated with a contact on a list of contacts; and refrain from generating a notification associated with receiving the communication based on the person being associated with the contact on the list of contacts.

Figure 10:
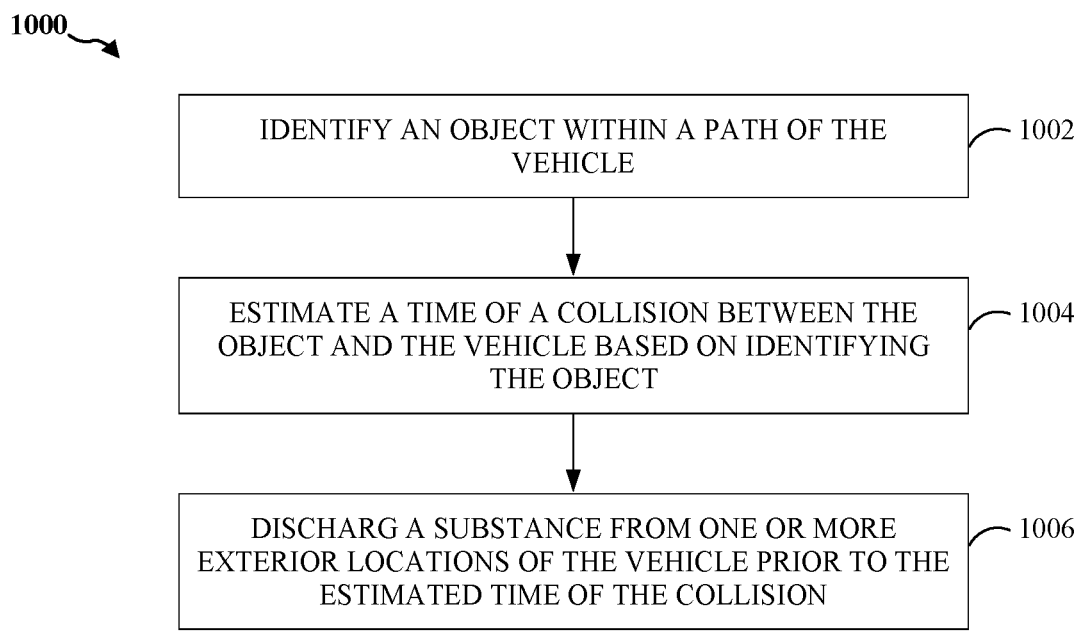
FIGS. 10, 11, 12, and 13 are flow diagrams illustrating respective examples of a process performed in accordance with various aspects of the present disclosure.

FIG. 10 is a flow diagram illustrating an example process 1000 performed, for example, by a vehicle, in accordance with various aspects of the present disclosure. The example process 1000 is an example of preventing a collision at a vehicle, 1000. As shown in FIG. 10, the process 100 begins at block 1002, by identifying an object within a path of the vehicle. At block 1004, the process 1000 estimates a time of a collision between the object and the vehicle based on identifying the object. At block 1006, the process 1000 discharges a substance from one or more exterior locations of the vehicle prior to the estimated time of the collision. The process 1000 may be performed in combination with one or more other process 1100, 1200, or 1300.

Figure 11:
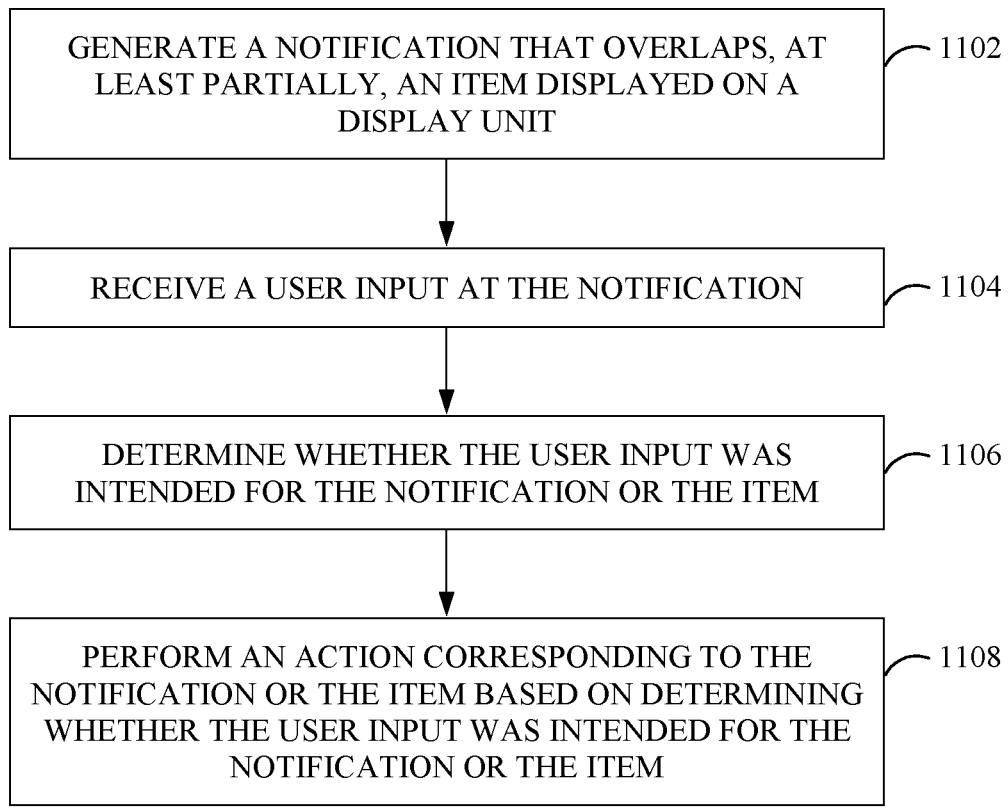

FIG. 11 is a flow diagram illustrating an example process 1100 performed, for example, by a user equipment, in accordance with various aspects of the present disclosure. The example process 1100 is an example of performing an action based on a user input. The process 1100 may be performed by a UE, such as a UE 120 described with reference to FIGS. 1B, 2, and 9, or an interface, such as the interface 650 described with reference to FIG. 6A. The process 1100 may be performed in combination with one or more other process 1100, 1200, or 1000. At block 1102, the process 1100 generates a notification that overlaps, at least partially, an item displayed on a display unit. At block 1104, the process 1100 receives a user input at the notification. At block 1106, the process 1100 determines whether the user input was intended for the notification or the item. At block 1108, the process 1100 performs an action associated with the user input based on determining whether the user input was intended for the notification or the item.

Figure 12:
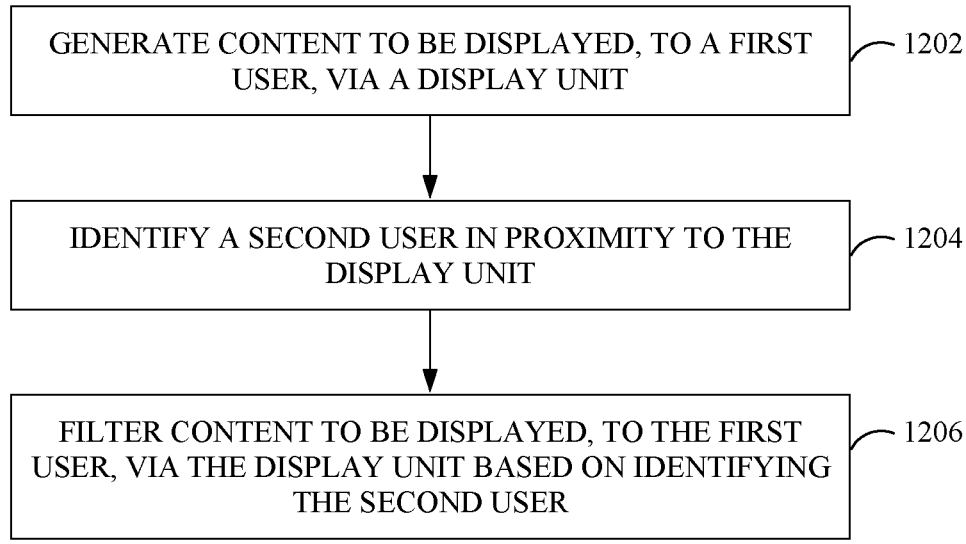

FIG. 12 is a flow diagram illustrating an example process 1200 performed, for example, by a user equipment, in accordance with various aspects of the present disclosure. The example process 1200 is an example of filtering content. The process 1200 may be performed by a UE, such as a UE 120 described with reference to FIGS. 1B, 2, and 9, or an interface, such as the interface 650 described with reference to FIG. 6A. The process 1200 may be performed in combination with one or more other process 1100, 1300, or 1000. At block 1202, the process 1200 generates content to be displayed, to a first user, via a display unit. At block 1204, the process 1200 identify a second user in proximity to the display unit. At block 1206, the process 1200 filters content to be displayed, to the first user, via the display unit based on identifying the second user.

Figure 13:
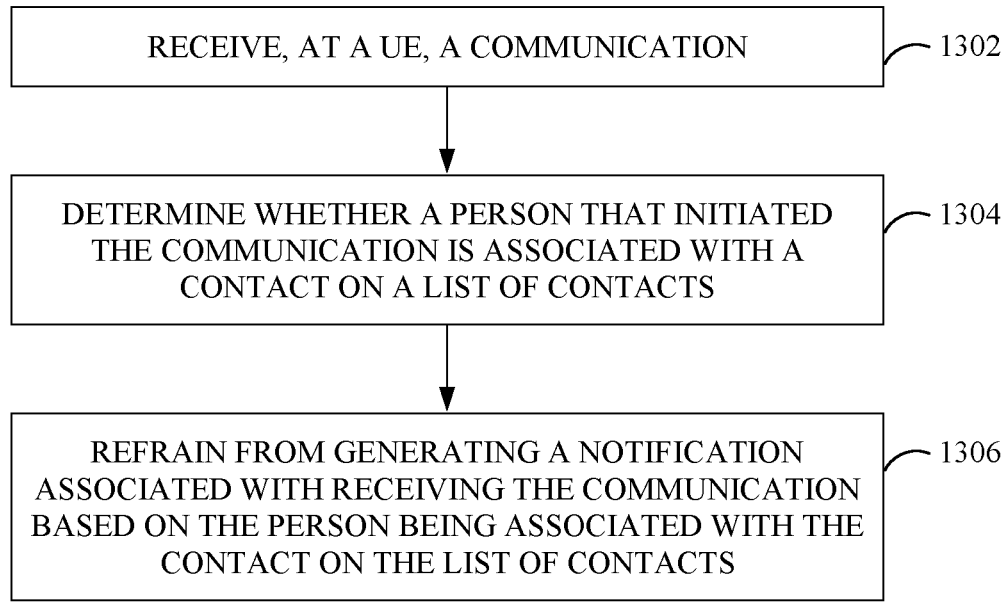

FIG. 13 is a flow diagram illustrating an example process 1300 performed, for example, by a user equipment, in accordance with various aspects of the present disclosure. The example process 1300 is an example of filtering contacts. The process 1300 may be performed by a UE, such as a UE 120 described with reference to FIGS. 1B, 2, and 9, or an interface, such as the interface 650 described with reference to FIG. 6A. The process 1300 may be performed in combination with one or more other process 1100, 1200, or 1000. At block 1302, the process 1300 receives, at a UE, a communication. At block 1304, the process 1300 determines whether a person that initiated the communication is associated with a contact on a list of contacts. At block 1306, the process 1300 refrain from generating a notification associated with receiving the communication based on the person being associated with the contact on the list of contacts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for filtering content at a user equipment (UE), comprising:
    displaying, at a first time period via a display associated with the UE, first content, the first content being displayed in response to an input received from an ego person using the UE;
    displaying, subsequent to displaying the first content, third content that partially overlaps the first content;
    receiving, from the ego person, an input at a location corresponding to the third content;

selectively ignoring the input based on one or more of: the type of third content, one or more previous inputs received from the ego person, a type of first content, or a time between displaying the third content and receiving the input;
detecting, via one or more sensors associated with the UE, a neighboring person within proximity of the UE; and
filtering the first content to prevent second content that satisfies filtering criteria from being displayed at the display in accordance with detecting the neighboring person.

2. The method of claim 1, further comprising:
detecting, via one or more sensors associated with the UE, a neighboring person within proximity of the UE; and
filtering the first content to prevent second content that satisfies filtering criteria from being displayed at the display in accordance with detecting the neighboring person, wherein the second content satisfies the filtering criteria based on the second content being flagged as inappropriate content.

3. The method of claim 2, wherein the inappropriate content is associated with content deemed inappropriate by the ego person, a third-party associated with a content provider, and/or a machine-learning model trained to identify the inappropriate content.

4. The method of claim 2, wherein:
the neighboring person is one of a group of neighboring persons; and
each one of the group of neighboring persons is associated with respective filtering criteria.

5. The method of claim 2, the first content is filtered until the neighboring person is no longer within the proximity of the UE.

6. The method of claim 2, further comprising displaying, at a second time period, the filtered first content in accordance with the filtering.

7. The method of claim 2, wherein the neighboring person is within the proximity based on a distance between a first location of the neighboring person and a second location of the UE being less than a distance threshold.

8. The method of claim 1, wherein the input is a touch input.

9. The method of claim 1, further comprising:
enabling a notification filtering mode in response to an input from the ego person;
receiving, from a first contact, a first communication while the notification filtering mode is enabled;
suppressing a first notification of the first communication from the first contact in accordance with the first contact being included in a filtering mode list;
receiving, from a second contact, a second communication while the notification filtering mode is enabled; and
displaying a second notification of the second communication from the second contact in accordance with the second contact not being included in the filtering mode list.

10. The method of claim 9, further comprising:
generating a reply to the first contact in accordance with suppering the notification; and
transmitting, to the first contact, the reply, wherein the reply is generated based on one or more previous messages with the first contact, a current location of the UE, and/or a current time.

11. The method of claim 9, further comprising displaying the second notification of the first communication after the notification filtering mode is disabled.

12. A user equipment (UE), comprising:
one or more processors; and one or more memories coupled with the one or more processors and storing processor-executable code that, when executed by the one or more processors, is configured to cause the UE to:
display, at a first time period via a display associated with the UE, first content, the first content being displayed in response to an input received from an ego person using the UE;
display, subsequent to displaying the first content, third content that partially overlaps the first content; receive, from the ego person, an input at a location corresponding to the third content;
selectively ignore the input based on one or more of: the type of third content, one or more previous inputs received from the ego person, a type of first content, or a time between displaying the third content and receiving the input;
detect, via one or more sensors associated with the UE, a neighboring person is within proximity of the UE; and
filter the first content to prevent second content that satisfies filtering criteria from being displayed at the display in accordance with detecting the neighboring person.

13. The UE of claim 12, wherein:
execution of the processor-executable code further causes the UE to:
detect, via one or more sensors associated with the UE, a neighboring person is within proximity of the UE; and
filter the first content to prevent second content that satisfies filtering criteria from being displayed at the display in accordance with detecting the neighboring person; and
the second content satisfies the filtering criteria based on the second content being flagged as inappropriate content.

14. The UE of claim 13, wherein the inappropriate content is associated with content deemed inappropriate by the ego person, a third-party associated with a content provider, and/or a machine-learning model trained to identify the inappropriate content.

15. The UE of claim 13, wherein:
the neighboring person is one of a group of neighboring persons; and
each one of the group of neighboring persons is associated with respective filtering criteria.

16. The UE of claim 13, wherein the first content is filtered until the neighboring person is no longer within the proximity of the UE.

17. The UE of claim 13, wherein execution of the processor- executable code further causes the UE to display, at a second time period, the filtered first content in accordance with the filtering.

18. The UE of claim 13, wherein the neighboring person is within the proximity based on a distance between a first location of the neighboring person and a second location of the UE being less than a distance threshold.

19. The UE of claim 12, wherein the input is a touch input.

20. A non-transitory computer-readable medium having program code recorded thereon for filtering content at a user equipment (UE), the program code executed by a processor and comprising:
program code to display, at a first time period via a display associated with the UE, first content, the first content being displayed in response to an input received from an ego person using the UE;

program code to display, subsequent to displaying the first content, content that partially overlaps the first content;

program code to receive, from the ego person, an input at a location corresponding to the third content;

program code to selectively ignore the input based on one or more of: the type of third content, one or more previous inputs received from the ego person, a type of first content, or a time between displaying the third content and receiving the input;

program code to detect, via one or More sensors associated with the UE, a neighboring person is within proximity of the UE; and program code to filter the first content to prevent second content that satisfies filtering criteria from being displayed at the display in accordance with detecting the neighboring person.

\* \* \* \* \*